Patented Aug. 24, 1948

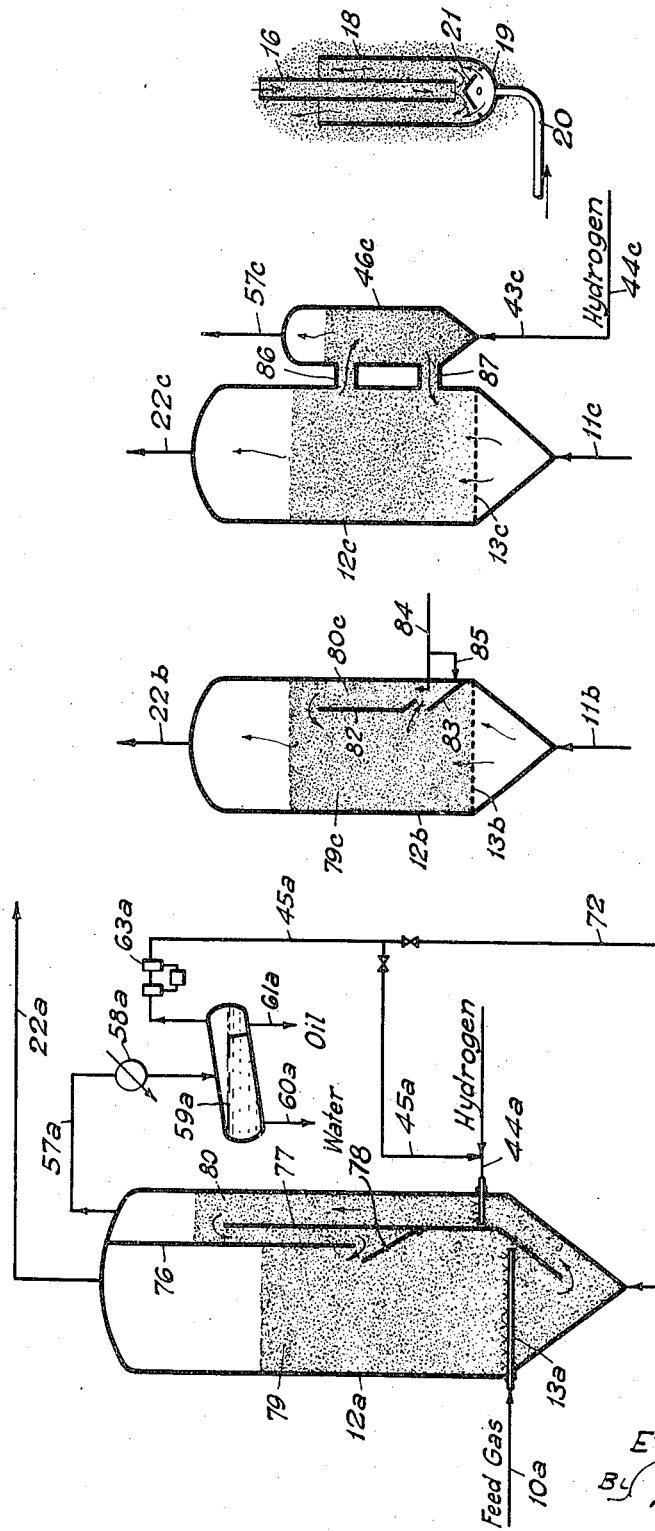

2,447,505

UNITED STATES PATENT OFFICE 2,447,505

HYDROCARBON SYNTHESIS WITH FLUIDIZED CATALYST REGENERATION

Everett A. Johnson, Park Ridge, Ill., assignor to Standard Oil Company, Chicago, Ill., a corporation of Indiana Application April 13, 1944, Serial No. 530,875

1 Claim. (Cl. 260—449.6)

This invention relates to hydrocarbon synthesis with fluidized catalyst regeneration and it pertains more particularly to improved methods and means for the continuous regeneration of cobalt-type catalysts and for utilizing regeneration gases in a carbon monoxide-hydrogen synthesis system for producing hydrocarbons having more than one carbon atom per molecule. With respect to general catalyst handling methods, this application is a continuation-in-part of my copending applications including Serial Nos. 392,846-7 filed May 10, 1941, and Serial No. 428,913 filed January 30, 1942.

In the synthesis of hydrocarbons from carbon monoxide and hydrogen with cobalt-type catalysts, the catalyst particles gradually lose their activity, partly at least on account of the deposition of excessive amounts of wax and wax-like materials thereon. It has been necessary in such processes to periodically discontinue the synthesis reaction and to regenerate the catalyst by contact with hydrogen. The catalyst activity gradually declines between regeneration steps and a variable load is thus imposed upon the product fractionation and recovery systems because of the change in product distribution and product yields which inevitably takes place when the catalyst loses activity. An object of my invention is to provide a method and means whereby the catalyst remains at substantially constant activity so that product distribution and yields remain substantially constant, the load on the fractionation system remains substantially constant and shut-down periods are avoided with the consequent savings in operating expense and increases in overall capacity.

A further object of the invention is to produce a greater conversion with a given amount of catalyst than has heretofore been possible. A further object is to utilize hydrogen in the regeneration step more effectively than it has been utilized in any prior regeneration operations and to minimize the production of methane and to increase the production of valuable liquid hydrocarbons obtainable in the regeneration step as well as in the synthesis step itself. A further object is to use regeneration gases from the regeneration step more effectively and for different purposes than they have been heretofore used. Other objects will become apparent as the detailed description of the invention proceeds.

In practicing my invention I employ a fluidized bed of catalyst solids of small particle size in a synthesis zone and a separate or segregated fluidized bed of such solids in a much smaller regeneration zone. I continuously transfer catalyst from the liquid-like dense turbulent suspended catalyst phase in the synthesis zone to the regeneration zone and continuously transfer regenerated catalyst from the liquid-like dense turbulent suspended catalyst phase in the regeneration zone back to the synthesis zone. The charge gas to the synthesis zone is a hydrogen-carbon monoxide mixture in an approximately 2:1 mol ratio. The regeneration gas is essentially hydrogen and although it may contain more or less inert diluents, its CO content should be so low as is commercially feasible. The hydrogen is usually not utilized to the maximum extent in a once-through operation and I may therefore recycle a substantial amount of the gases leaving the regenerator with the hydrogen which is introduced thereto. The hydrogen-rich gases from the regeneration step may also or alternatively be used for aeration and/or transfer of catalyst in the substantial absence of carbon monoxide. The use of such gas for carrying catalyst through a cooler is particularly advantageous because it effects at least partial stripping and regeneration thereof while the catalyst is passing through the cooling circuit. Certain advantages of the invention are attainable, however, even though the gases from the regeneration zone are introduced into the synthesis zone, the effluent product stream or absorber. When gases from the regeneration zone are mixed with feed gases entering the synthesis zone, such feed gas may be deficient in hydrogen and the deficiency may be supplied by the hydrogen-rich regeneration gases.

It is essential that the regeneration be effected in a zone which is separate and distinct from the conversion zone because any substantial increase in hydrogen in the conversion zone and in the presence of carbon monoxide leads to excessive methane production and greatly decreases the yields of liquid products. However, the regeneration zone and synthesis zone may be in one and the same chamber provided that suitable baffles or seals are provided to maintain the zones separate and distinct. A feature of my invention is the provision of seals which depend for their operation on the relative densities of the fluidized catalyst solids in different parts of the system. By varying the amount of aeration gas which is introduced into a fluidized catalyst mass the density of the mass may be increased or decreased at will. By correlating the effective heights of catalyst columns with densities thus regulated by controlled aeration, directions of catalyst flow may be established and flow rates may be controlled.

The fluidized mass of catalyst thus may serve effectively as the seal between reaction and regeneration zones. Such seals may likewise be employed to prevent back-flow through cyclone separator dip legs. Other features of the invention will be apparent from the following detailed description of specific examples thereof read in conjunction with the accompanying drawings which form a part of this specification and in which Figure 1 is a schematic flow diagram of my conversion-regeneration system employing external catalyst regeneration;

Figure 2 is a schematic flow diagram of such a system employing internal regeneration;

Figure 3 illustrates a modified form of the internal regeneration system;

Figure 4 illustrates a modified form of the external regeneration system, and

Figure 5 is a detailed vertical section taken across a cyclone separator dip leg and its associated elements.

Figure 1:
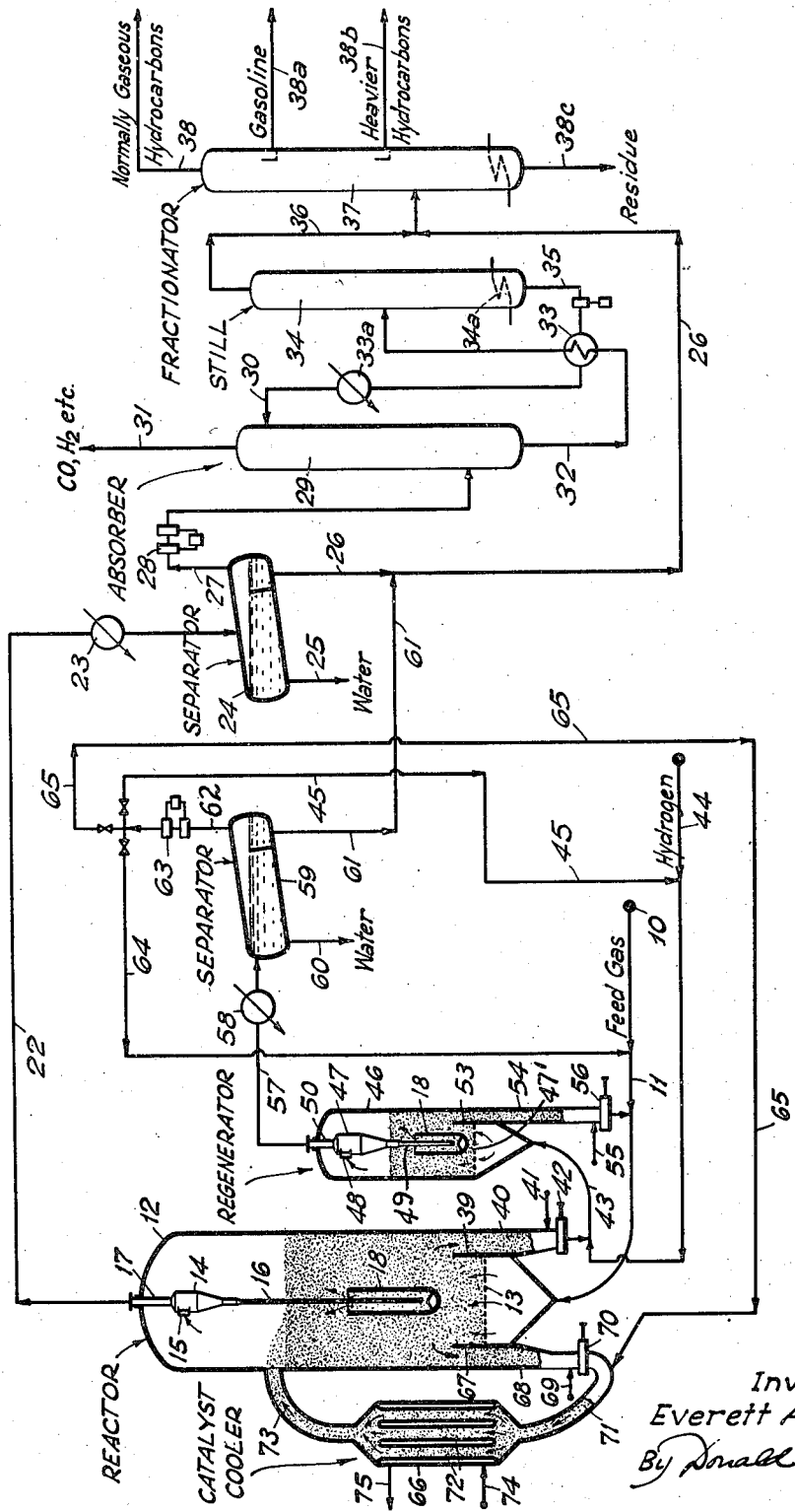

The feed gas for the synthesis reaction when using a cobalt-type catalyst is a mixture of hydrogen and carbon monoxide in approximately a 2:1 ratio and it may be obtained from any source known to the art. It may be prepared by reacting natural gas (methane) with carbon dioxide and steam noncatalytically at temperatures upward of 2000° F. or in the presence of catalyst such as nickel supported on alumina or firebrick at a temperature of about 1400 to 1800° F., usually within the approximate range of 1500 to 1600° F. at substantially atmospheric or slightly superatmospheric pressure. The feed gas, however, may be obtained from any source such as coal, shale or other carbonaceous material in manners which are well known to the art and which require no detailed description. The feed gas should be substantially free from sulfur, i. e. should contain less than about .1 grain of sulfur per 100 cubic feet of gas (all gas volumes being thus measured at atmospheric pressure and 60° F. temperature). Small amounts of nitrogen and carbon dioxide may be tolerated but it is desirable to keep such inert diluents to a minimum.

The catalyst for the synthesis step is preferably of the cobalt type. It promotes the reaction

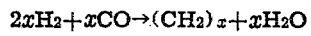

$$2xH_2 + xCO \rightarrow (CH_2)_x + xH_2O$$

The catalyst should be in finely divided form, i. e. should substantially all pass a 30 or 40 mesh screen and should have particle sizes chiefly within the range of 2 to 200 microns or preferably about 20 to 100 microns. In other words, the catalyst should be in such finely divided or powdered form that it can be "fluidized" by gases upwardly therethrough at low velocity and maintained in dense phase turbulent suspension without segregation, slugging or other difficulties which result from the use of large catalyst particles or high gas velocities. The optimum gas velocity is within the approximate range of 1 to 3 feet per second, e. g. about 1½ foot per second although for some catalysts the gas velocity may be as low as .4 and in other cases it may be as high as 4 feet per second. The use of catalyst particles of such structure, shape and size as to be fluidized by upflowing gases of such velocity is an important feature of the invention.

The cobalt-type catalyst may consist essentially of supported cobalt either with or without one or more promoters such as oxides of magnesium, thorium, manganese, zirconium, titanium, uranium, cerium, aluminum, zinc, etc. The cobalt support is preferably an acid treated bentonite or montmorillonite clay such as Super Filtrol, but it may be diatomaceous earth or kieselguhr, especially a kieselguhr of low calcium and iron content. A porous structure is of course essential and most clays require pretreatment by ignition and acid washing. Other supports such as kaolin, alumina, silica, magnesia and the like may be employed but a Super Filtrol support is preferred. The catalyst may be prepared by precipitating cobalt and promoter carbonates from nitrate solutions in the presence of the support. In the case of thoria, for example, the promoter may be in amounts of 15 or 20% based on cobalt, higher thoria concentrations being objectionable because of their tendency to promote wax formation. The cobalt–Super Filtrol ratio may be varied from about 5:1 to .1:1 but is usually about 0.3:1 to 1:1. The precipitated catalyst after filtering, washing and drying is reduced before use, preferably with hydrogen, at a temperature of about 400 to 650° F. A typical catalyst ready for use may contain about 32% cobalt, 1½% thorium oxide, 2½% magnesium oxide and 64% Super Filtrol. No invention is claimed in any specific catalyst composition or in any method of making the catalyst and since such compositions and methods are well known to the art they will require no further description.

The invention is not limited to catalysts in which cobalt is the essential component but is applicable to such catalysts as nickel catalysts, ruthenium catalysts and in fact any and all catalysts which are regeneratable by hydrogen under approximately the temperature and pressure conditions of the synthesis step.

A commercial plant for producing 5000 barrels per day of hydrocarbon synthesis product liquid (including butanes) with a cobalt-type catalyst will require a reactor about 30 to 35 feet in diameter and about 60 to 70 feet in height when operating at about 45 pounds per square inch gauge at a temperature of about 400° F. Operations effected at lower pressure will require reactors of increased diameter or a plurality of reactors while operations at higher pressure will require lesser diameters but increased height. Usually the reactor for any operating conditions is designed for an upflow gas or vapor velocity of approximately 1½ feet per second. From these general principles and the detailed description of a specific commercial unit reactor, sizes and shapes may readily be computed for other catalysts and operating conditions.

Referring to Figure 1, the feed gas stream is introduced from source 10 through line 11 to reactor 12 and it is preferably distributed at the base of the reactor by a perforated plate or other distributor means 13. The reactor in this case is a cylindrical vessel about 30 feet in diameter by about 70 feet in height. The feed gas consists essentially of hydrogen and carbon monoxide in approximately a 2:1 ratio and the feed rate is in the general vicinity of 6,000,000 cubic feet per hour. The gas is introduced at about 3 atmospheres or about 45 pounds per square inch gauge.

The reactor 12 contains in the general vicinity of 1 to 4, e. g. about 2 to 2½ million pounds of the finely divided cobalt-type catalyst. With an upward linear velocity of about 1½ feet per second in the reactor this catalyst is maintained in suspended turbulent dense phase condition at a density in the general vicinity of 40 to 60 pounds per cubic foot, the densities depending of course upon the particular type of catalyst but it should be about .3 to .9, preferably about .5 to .6 times the density of the settled catalyst. The space velocity through the reactor may be in the general vicinity of 50 to 500 or more volumes of gas per hour per volume of space occupied by the dense catalyst phase and is usually within the range of about 100 to 200, or about 150 cubic feet per hour per volume of reactor occupied by dense phase catalyst, all gas volumes being measured at 60° F. and atmospheric pressure.

The heat of reaction may be dissipated and the reaction temperature may be held at the desired level of between about 300 and 425° F. by recycling catalyst through an outside cooler, as will be hereinafter described, or cooling coils or tubes can be provided within the synthesis reactor 12. Alternatively water condensed and separated from the product stream may be returned and sprayed or atomized into the reactor itself at the rate of approximately 20,000 to 35,000 gallons per hour. A fraction of the product stream boiling chiefly within the range of about 250 to about 350° F. may likewise be recycled, sprayed or atomized into the reactor at various levels. The use of the outside cooler offers particular advantages in my system in that it provides effective means for utilizing hydrogen-rich gas mixtures and for augmenting the removal of waxy deposits from catalyst surfaces.

The bulk of the catalyst separates from the light dispersed phase which is maintained above the dense phase in the reactor and settles back to said dense phase. Residual amounts of entrained catalyst particles may be separated from the exit gas stream by means of one or more centrifugal separators of the cyclone or multiclone type and such separators may be employed in any required number and mounted either in parallel or series, or both. Such centrifugal separation means is diagrammatically illustrated in the drawing by cyclone separator 14 provided with inlet 15, dip leg 16 and gas outlet 17. The dip leg extends vertically downwardly into the dense catalyst phase and it is preferably surrounded at its lower end by a tube 18 (note Figure 5) having a closed bottom end 19 through which an aeration gas is introduced through line 20 and directed toward the annular space between dip leg 16 and tube 18 by means of a distributor 21. This distributor may be a cone-shaped element welded to bottom wall 19 so that the upper surface of the cone-shaped element may serve to deflect catalyst toward the outer annular space and the aeration gas may supplement and expedite the dispersion of the catalyst in this annular space and maintain the catalyst in the annular space in more highly aerated condition than the catalyst which is flowing downwardly in dip leg 16. The tube or boot 18 thus provides a seal for the lower end of dip leg 16 so that any pressure surges in the reactor will not be transferred to dip leg 16. The lower density of the catalyst in the annular space and the gas lift effect of the aeration gas insures smooth and uninterrupted flow from the base of the dip leg into the reactor and thus prevents any blow-back or clogging of the dip leg. Bottom wall 19 prevents upflowing gases in reactor 12 from entering dip leg 16. The use of a column of catalyst in the dip leg for counterbalancing the pressure drop through the cyclone separator is more fully described in U. S. Letters Patent 2,337,684.

The overhead stream from the top of the reactor, or from line 17 if cyclone separators are employed, passes through line 22 and cooler 23 to separator 24 from which water may be withdrawn through line 25, liquid hydrocarbons through line 26 and gases and vapors through line 27. The gases and vapors are passed by compressor 28 to absorption tower 29 wherein it countercurrently contacts absorber oil introduced through line 30, the unabsorbed gases removed through line 31 being recycled to the reactor, employed for producing synthesis gas, or burned as fuel. Rich absorber oil passes through line 32 and heat exchanger 33 to stripping settler 34 which is provided with a suitable heater 34a. Lean absorber oil from the base of the stripper is returned through line 35, heat exchanger 33 and cooler 33a to absorber tower 29.

The overhead from the stripper 34 passes by line 36 to fractionating system 37 from which a normally gaseous hydrocarbon stream may be withdrawn through line 38, a gasoline boiling range stream through line 38a, a gas oil boiling range stream through line 38b and a residual stream through line 38c. The fractionation system is diagrammatically illustrated in the drawings and in actual practice it will of course be understood that it will include a plurality of columns, suitable reboiling and reflux means associated with each column, etc. but since such fractionation systems are well known to those skilled in the art they will require no detailed description. In accordance with my invention the load on the absorption and fractionation system remains substantially constant because of the uniform activity of the catalyst in the reactor which is maintained in the manner which will now be described.

Extending upwardly in reactor 12 to a point below the upper level of the dense catalyst phase is a conduit 39 which forms the upper part of the standpipe 40. The dense phase cataylst which accumulates in this standpipe is maintained in aerated condition by the introduction of an aeration gas such as hydrogen, steam, carbon dioxide or the like through line 41. Catalyst is discharged from the base of this standpipe in amounts controlled by valve 42 into transfer line 43 into which hydrogen is introduced through line 44 and a hydrogen-rich recycle gas may be introduced through line 45. Catalyst thus suspended in the hydrogen stream is carried to the base of regenerator 46. It is preferably introduced at the base of the regenerator through a suitable distributor and for this purpose I may employ a perforated plate 47'. Regenerator 46 is much smaller than reactor 12 and may in this case be about .5 to 5, for example about 2 feet in diameter by about 5 to 30, for example about 20 feet in height. Here the vertical upward velocity of the gases should be such as to maintain a liquid-like dense turbulent suspended phase of catalyst material in the lower part of the regenerator superimposed by a light dispersed catalyst phase and while the velocities may be of the order of 1 to 3 feet per second they are preferably of the order of .2 to 2 feet per second. Most of the catalyst settles by gravity from the dispersed phase to the dense phase but here again centrifugal separators may be employed for knocking back any entrained catalyst particles. Such separators are diagrammatically illustrated by cyclone separator 47 provided with inlet 48, dip leg 49 and discharge line 50. The lower end of the dip leg may be surrounded by a suitable "boot" at the base thereof into which an aeration gas may be introduced in the manner more specifically illustrated in connection with Figure 5.

Catalyst is removed from regenerator 46 at substantially the same rate as it is introduced thereto and its average holding time in the regenerator may be within the approximate range of about 1 minute to an hour or more, for example, about 30 minutes. Catalyst is removed from the regenerator through conduit 53 which forms the upper part of standpipe 54. This standpipe may likewise be provided with a line 55 for introducing an aeration gas at its base and with a valve 56 for controlling the rate at which catalyst is introduced into line 11 wherein it is picked up with incoming feed gas and returned to reactor 12. It should be understood that while only a single aeration gas line is shown on standpipes 40 and 54 a plurality of such aeration means may be employed.

In this particular example the reactor is operated at about 45 pounds per square inch gauge pressure and at a temperature of about 400° F. but it should be understood that the temperature may be within the approximate range of 300 to 450° F. and the pressure may be from substantially atmospheric pressure to 100 pounds per square inch or higher. The pressure in the regenerator should be approximately the same as that in the reactor. Standpipe 40 should be of such height as to provide a pressure at its base which is slightly higher than the pressure in line 43 and standpipe 54 should be of such height as to provide a pressure at its base which is slightly higher than that in line 11; the standpipes thus provide the necessary pressure for catalyst transfer and act as seals to prevent backflow of gases. The energy required for circulating catalyst is supplied by the gas streams entering the reactor and the regenerator, they carry the catalyst by gas-lift effect and the necessary pressure differentials for catalyst flow are obtained by virtue of the densities in standpipes 40 and 54 being greater than densities of the entering gas streams.

The temperature maintained in regenerator 46 may be in approximately the same range as the temperature maintained in the reactor although in particular cases the regenerator temperature may be higher or lower than the reactor temperature. Thus with the reactor at 400° F. the regenerator may be operated within the approximate range of 300 to 600° F. or more, preferably 390 to 430° F., e. g. about 415° F. If the hydrogen employed for catalyst regeneration contains any appreciable amounts of carbon monoxide the reaction thereof with the hydrogen will liberate heat and thus facilitate high temperature operations. Regeneration may be effected in the presence of appreciable amounts of carbon monoxide provided that the hydrogen : carbon monoxide ratio is much greater than that employed in the reactor, i. e. with ratios in the approximate range of 4:1 to 20:1 but in this case heat must usually be removed from the regenerator and it may be so removed by any of the means hereinabove described in connection with the reactor. With hydrogen containing no appreciable amounts of carbon monoxide no extensive temperature control means are necessary for the regenerator although a heat exchanger may be interposed between standpipe 40 and regenerator 46 so that the stream entering regenerator through line 43 may be cooled or heated to the extent necessary for maintaining the desired temperature level. At this temperature level there is usually formation of at least some normally liquid hydrocarbons and a removal of heavy deposits from the catalyst, such removal being particularly important in fluidized catalyst operations.

The gases leaving the upper part of the regenerator 46 through line 57 are usually still quite rich in hydrogen. These gases may be combined with feed gases entering the reactor through line 11, in which case any hydrogen deficiencies in the feed gases may be made up by the hydrogen in the regeneration gases so that the gas mixture entering the reactor will contain hydrogen and carbon monoxide in the desired ratio. Regeneration gases from line 57 may also be combined with the effluent product stream in line 22 or they may be compressed and introduced into absorber 29. At least a substantial amount of such gases may be recycled to line 43 along with hydrogen entering the base of the regenerator. I prefer, however, to pass the gases from line 57 through cooler 58 in order to condense normally liquid products, and to introduce the cooled stream into separator 59 for separating out any condensed materials. Water may be withdrawn from the settler through line 60 along with any catalyst particles that may have been carried over from the regenerator. Liquid hydrocarbons may be withdrawn through line 61 and introduced to fractionator 34. Uncondensed gases which leave the top of the separator through line 62 may then be picked up by compressor 63 for recycle to the system at any of several points.

Since only a small portion of the hydrogen is usually utilized in a once-through passage through the regenerator the bulk of the gases discharged from compressor 63 may be recycled through line 45 to transfer line 43 so that the hydrogen goes round and round through the regenerator and is thus more completely and effectively utilized. This recycling of the hydrogen gas through the regenerator effects a great saving in the amount of relatively pure hydrogen which must be introduced through line 44 and since the production of hydrogen is more expensive than the production of hydrogen-carbon monoxide mixtures, the recycling of regenerator gases through the regenerator effects substantial savings.

That portion of the gas discharged from compressor 63 which is not recycled to the regenerator may be passed through line 64 to line 11 for introduction into the base of reactor 12 and it may thus supply any deficiency in the hydrogen content of the feed gas. When the hydrogen from line 44 contains appreciable amounts of carbon monoxide and economic conditions warrant, all of the regeneration gases may be passed via lines 64 and 11 to the reactor. When relatively pure hydrogen is employed about 5 to 10 volumes of gases may be recycled through line 45 for each volume transferred to the reactor through line 64. This method of operation offers marked advantages over the passage of gases from compressor 63 to line 22 or to absorber 29.

When the reactor temperature is controlled by recycling catalyst through a cooler it may be most advantageous to employ gases discharged by compressor 63 for effecting catalyst transfer through the cooling circuit. In this case a part or all of the regeneration gases will be passed via line 65 through cooler 66. Catalyst from the dense phase in the reactor will pass downwardly through the large internal conduit 67 and standpipe 68 and may be maintained in aerated condition in the standpipe by means of an inert aeration gas introduced through line 69. Catalyst may be discharged from the base of the standpipe in amounts controlled by valve 70, picked up in hydrogen-rich gas from line 65 and conveyed through transfer line 71 to heat exchanger 66, the discharged catalyst preferably flowing upwardly through tubes in this heat exchanger which tubes are surrounded with a cooling fluid. The cooled catalyst is then returned to the reactor by transfer line 73. A cooling fluid such as water may be introduced through line 74 around the outside of the tubes and hot water or steam may be withdrawn through line 75. In this method of operation the carbon monoxide may be substantially displaced from the catalyst by aeration gas in standpipe 68 and when the hydrogen-rich gas from line 65 meets the hot catalyst in transfer line 71 and carries it upward to and through the cooler it may exert substantial stripping and regeneration of the catalyst, freeing it to a considerable extent of heavy liquid or waxy deposits. The regeneration thus accomplished is not as effective as the regeneration accomplished in regenerator 46 because of the very short time of contact but nevertheless an effective amount of stripping is thus obtained and the catalyst activity is enhanced by its contact with hydrogen instead of being degraded as might be the case if steam were used as the catalyst transfer medium.

Regardless of the particular manner in which the regeneration gases are utilized it will be seen from the above description that I have provided a method and means for maintaining substantially constant catalyst activity in the reactor so that throughout long on-stream periods the product yields and the product distribution may be held substantially constant. This uniformity of catalyst activity over a long period of time is accomplished by continuously stripping or regenerating only a small amount of the catalyst, the amount passing through the regenerator per day being only about 5 to 50% or preferably 10 to 20% of the amount of catalyst which is constantly maintained in the reactor. The rate at which catalyst is regenerated may thus be controlled and varied over a substantial range so that the total volume of catalyst is in effect subjected to regeneration every 2 to 20 days.

Various changes in the specific form of apparatus illustrated in Figure 1 may be made without departing from the invention. The standpipes in either the reactor or regenerator or both may communicate directly with the base of the respective chamber and the gases and catalyst material may be introduced thereto at a higher level. Structures may be employed as exemplified by U. S. Letters Patent 2,337,684; 2,341,193, etc. In any event, however, catalyst will be maintained in liquid-like dense turbulent suspended phase in both the reactor and the regenerator and there will be a continuous transfer from the reactor to the regenerator and from the regenerator back to the reactor.

Instead of employing separate regenerator and reactor vessels I may effect reaction and regeneration in separate zones inside of one and the same vessel as illustrated, by way of example, in Figure 2. In this case the feed gas enters the system through line 10a and is distributed at the base of the reaction zone through distributor 13a. The vessel 12a is of slightly larger diameter than reactor 12 and is provided with an upper baffle 76 extending downwardly from the top of vessel 12a and a lower baffle 77 extending from below the top of vessel 12a to a point spaced from the bottom thereof. The space between baffles 76 and 77 forms a conduit which serves the function of standpipe 54. A deflector 78 on baffle 77 may serve to prevent upflowing gases in reaction zone 79 from entering regeneration zone 80. Deflector 78 may be pivotally mounted so that its upper end may be moved toward and away from baffle 76 in order to control the rate of flow of fluidized liquid-like catalyst material into reaction zone 79 and aeration gas may be introduced at this point to expedite the flow of catalyst into the reaction zone.

The catalyst in the conical base of this chamber is maintained in aerated liquid-like form by aeration gas introduced through line 81. Hydrogen is introduced through line 44a at such a rate and in such a manner as to provide a gas-lift effect in regenerator zone 80. By maintaining the dense phase level in zone 80 higher than the dense phase level in zone 79 catalyst flow may be maintained in the direction indicated by the arrows and the rate of catalyst flow may be regulated by changing the position of pivoted element 78 or by varying the rate at which hydrogen is introduced through line 44a.

The reaction product stream is withdrawn through line 22a. The regeneration gases are withdrawn through line 57a, passed through cooler 58a and introduced into settler 59a from which water is removed through line 60a and oil through line 61a. The gases from the settler are picked up by compressor 63a and the major part of them returned through line 45a to line 44a and the rest passed by line 81 for effecting aeration in the cone-shaped bottom of reactor vessel 12a.

In this case as in the previous case, regeneration will be effected in a separate and distinct zone and there will be continuous catalyst transfer from the reactor to the regenerator and thence back to the reactor.

In Figure 3 I have illustrated an embodiment wherein regeneration is effected in a separate and distinct internal zone but wherein regeneration gases are combined with the effluent product stream. In this case reactor 12b is provided with a baffle 82 the top of which is below the dense phase level and the bottom of which is preferably inclined toward the adjacent reactor wall. Below the bottom of baffle 82 I provide a cooperating inclined baffle 83 which may be pivoted at its juncture with the reactor wall so that its upper end may be moved toward and away from baffle 82 for regulating catalyst flow. Hydrogen may be introduced through line 84, a small amount of the hydrogen being introduced through branch line 85 in order to maintain the catalyst above baffle 83 in an aerated condition. By regulating the amount of hydrogen introduced through line 84 the density in regeneration zone 80c may be sufficiently less than the density of the catalyst in reactor 79c so that there will be a net upward flow of catalyst in the regeneration zone 80c as indicated by the arrows. By using sufficiently low vertical velocities in regeneration zone 80c the density may be greater than that in reaction zone 79c so that the catalyst flow through this zone will be opposite to that shown by the arrows.

In Figure 4 I have illustrated as another embodiment of my invention a system wherein external regenerator 46c communicates with reactor 12c through an upper conduit 86 which is below the dense phase level in reactor 12c, and a lower conduit 87 which is adjacent the bottom of the reactor but above distributor 13c. Here again the flow through the regenerator is controlled by regulating the catalyst density in the regenerator as compared with that in the reactor. By employing a low upward hydrogen velocity in regenerator 46c the catalyst density may be sufficiently greater than that in reactor 12c to establish catalyst flow in the direction of the arrows. The remainder of the system in the embodiments illustrated in Figures 3 and 4 will be the same as hereinabove described in connection with Figure 1 and hence will require no further detailed description.

Figure 5 has already been described in connection with Figure 1 but it should be pointed out that the aeration gas which is introduced by line 20 and which aerates the catalyst in the zone between dip leg 16 and pipe 18 may be hydrogen. By using hydrogen for thus effecting aeration in catalyst transfer I effect a substantial amount of stripping and even regeneration of the catalyst and since this contacting of the catalyst with hydrogen is in the substantial absence of carbon monoxide I can effect this stripping without undue production of methane. Instead of mounting pipe 18 at an intermediate point in the reactor it may be mounted at the side thereof and may function in the manner of the embodiment of my invention illustrated by Figure 3, the catalyst in this case being introduced into the regeneration zone by cyclone dip leg instead of between baffles 82 and 83.

In all embodiments of my invention I maintain the regeneration zone segregated from the reaction zone and effect continuous transfer of catalyst from each zone to the other. The regeneration may thus be effected in the substantial absence of carbon monoxide which is desirable because the presence of carbon monoxide with large quantities of hydrogen at temperatures of the order of 400° F. tends to produce unduly large proportions of methane. However, some carbon monoxide may be included in the hydrogen stream under regeneration conditions and in some cases an amount of liquid products may thus be produced which amounts to about 70% of that obtainable with an optimum hydrogen to carbon monoxide ratio from an equivalent amount of carbon monoxide. The exact function of the hydrogen in effecting regeneration is not clearly established but it is definitely more than a simple stripping of volatile products from catalyst material. It appears that wax-like deposits accumulate on catalyst particles and while a certain amount of such deposits may be actually beneficial, these amounts must not become excessive. With my continuous regeneration no excessive amounts of wax-like deposits accumulate on the catalyst.

While specific embodiments of my invention have been described in considerable detail along with operating conditions employed therewith it should be understood that the invention is not limited to these particular examples since numerous modifications and alternative methods of operation will be apparent to those skilled in the art from the above description. Those skilled in the art will know for example that instead of employing ordinary heat exchangers for cooling the effluent product stream (exchanger 23) and the regenerator gas stream (exchanger 58) the presence of carry-over catalyst particles may require the use of scrubber-coolers, the gas being passed upwardly through a liquid scrubber and liquid from the base of the scrubber being pumped through a cooler back to the top thereof. Such details have been omitted from applicant's drawings because it is believed that the invention will be more clearly understood from the simplified schematic flow sheets presented herewith.

It will be noted that the withdrawal of catalyst for continuous regeneration or reactivation may be from the dilute phase as exemplified by cyclone separator 14, dip leg 16 and treating zone 18 (as shown in Figures 1 and 5). The catalyst may be withdrawn directly from the dense phase at a point below the upper level thereof, i. e. to standpipes 40 and 68 of Figure 1, under baffle 77 of Figure 2, between baffles 82 and 83 of Figure 3 and through passageway 86 in Figure 4; this embodiment of the invention is claimed in my continuation-in-part application Serial Number 731,241, filed February 27, 1947.

I claim:

The method of producing normally liquid products by a carbon monoxide-hydrogen synthesis reaction which method comprises passing a carbon monoxide-hydrogen mixture upwardly through a reaction zone in contact with a large mass of solid synthesis catalyst regeneratable by hydrogen and of small particle size at such a rate as to produce a liquid-like turbulent dense phase of said catalyst in said zone superimposed by a light catalyst phase, maintaining said zone under conditions of temperature and pressure for effecting reaction of said carbon monoxide and hydrogen to produce normally liquid products, centrifugally separating catalyst particles from the upper light catalyst phase within the reaction zone itself, passing the centrifugally separated catalyst as a downwardly moving column into a zone which is below the level of the dense catalyst phase and at least partially surrounded by said dense catalyst phase in the reaction zone but which is separated from said dense catalyst phase, introducing hydrogen at a low point in said last-named zone and passing catalyst from the base of said column back to said dense catalyst phase through said last-named zone while it is simultaneously undergoing aeration with said hydrogen.

EVERETT A. JOHNSON.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,238,726 | Feisst et al. | Apr. 15, 1941 |
| 2,266,161 | Campbell et al. | Dec. 16, 1941 |
| 2,347,682 | Gunness | May 2, 1944 |
| 2,360,787 | Murphree et al. | Oct. 17, 1944 |